June 8, 1926.
F. E. BEACH
1,587,498
SPARE TIRE LOCK
Filed April 15, 1925
3 Sheets-Sheet 1
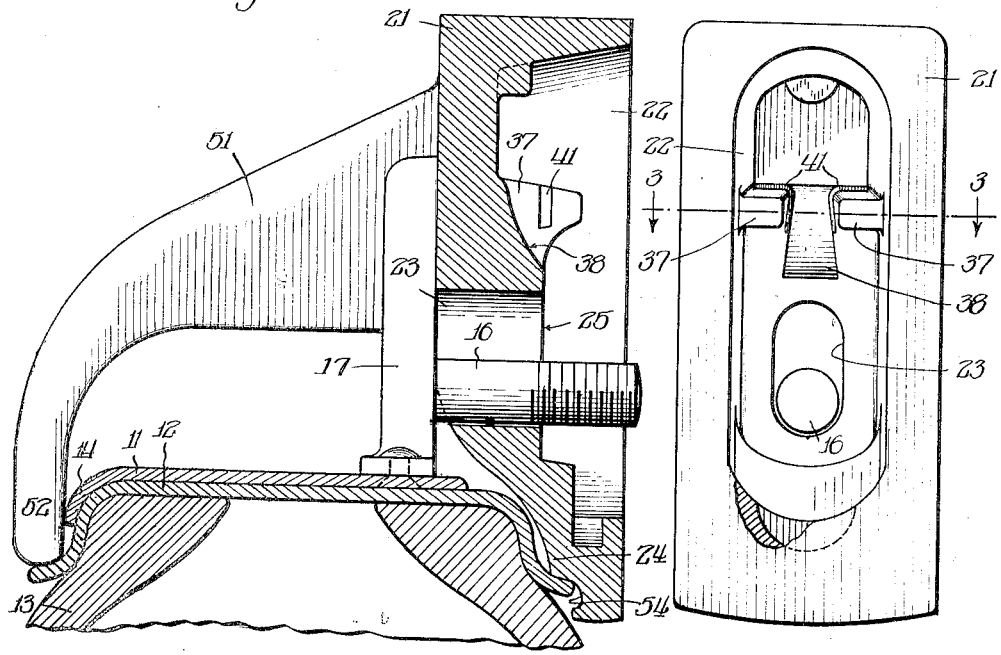
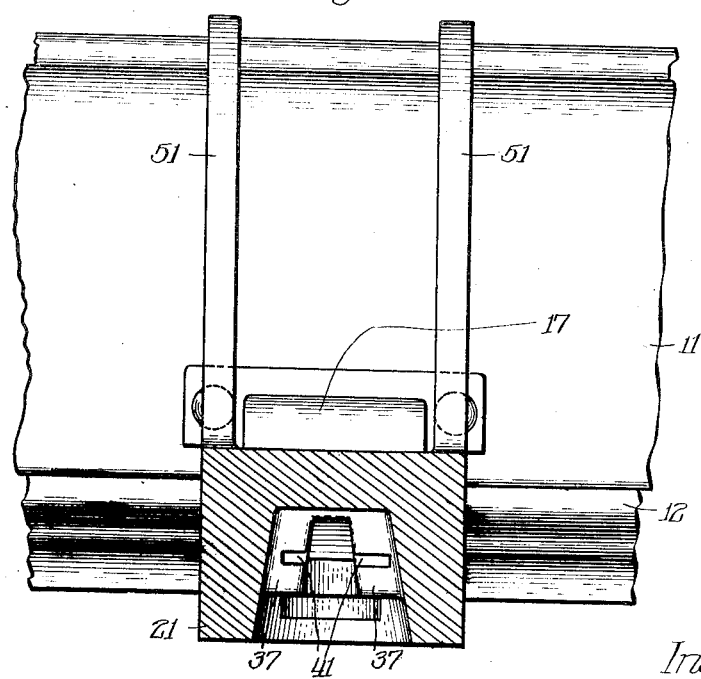
Inventor:
Frederick E. Beach,
Williams, Bradbury,
McCaleb & Hinkle Attys.

June 8, 1926.
F. E. BEACH
1,587,498
SPARE TIRE LOCK
Filed April 15, 1925
3 Sheets-Sheet 2
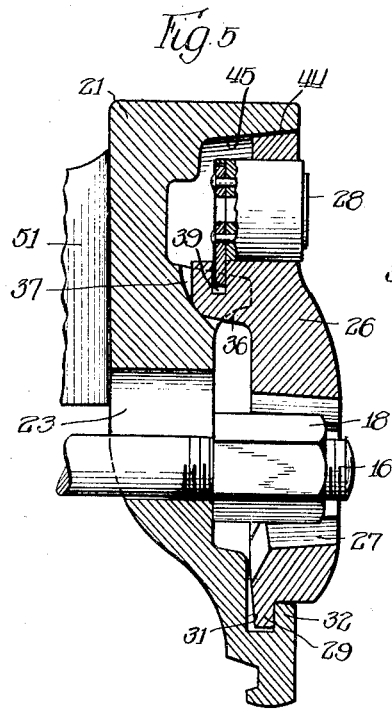
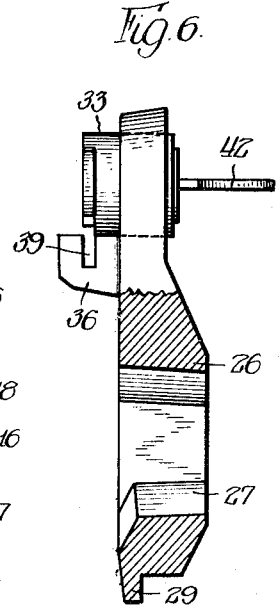
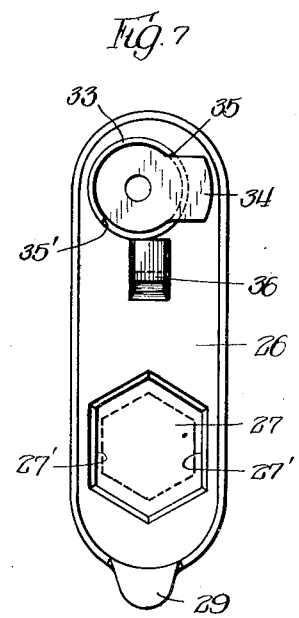
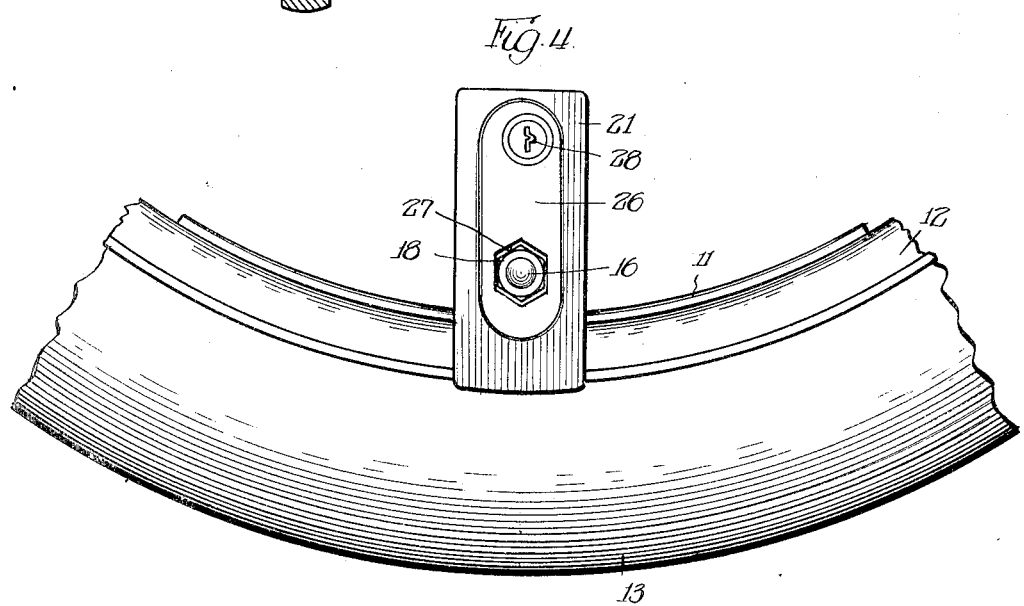
Inventor:
Frederich E. Beach,
Williams, Bradbury,
McCabe & Hinkle attys.

June 8, 1926.
F. E. BEACH
SPARE TIRE LOCK
Filed April 15, 1925   3 Sheets-Sheet 3
1,587,498
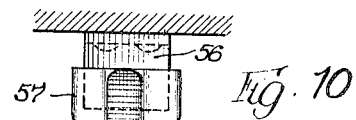
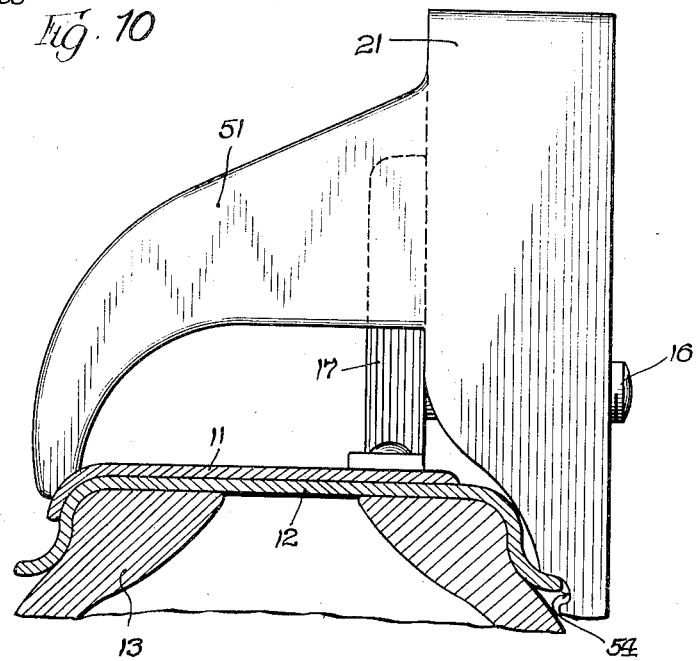
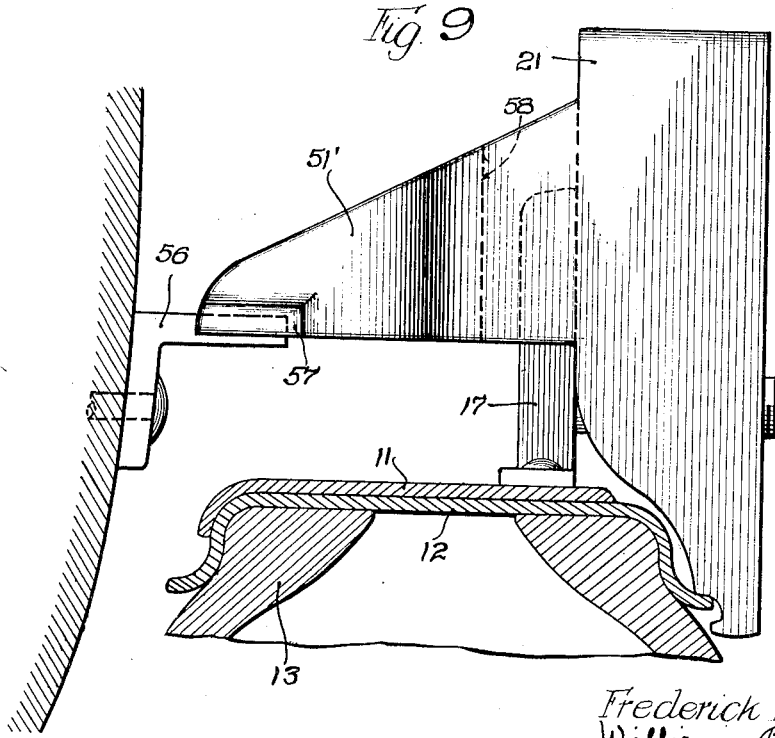
Inventor:
Frederick E. Beach,
Williams, Bradbury,
McCaleb & Hinkle Attys.

Patented June 8, 1926.

1,587,498

UNITED STATES PATENT OFFICE.

FREDERICK E. BEACH, OF CHICAGO, ILLINOIS, ASSIGNOR TO PINES WINTERFRONT COMPANY, OF CHICAGO, ILLINOIS, A CORPORATION OF DELAWARE.

SPARE-TIRE LOCK.

Application filed April 15, 1925. Serial No. 23,186.

The present invention relates to spare tire locks.

It is common practice for automobilists to carry a complete spare tire and detachable rim ready to be placed on a wheel in the event of the necessity for replacement of a tire in use, such spare tire generally being mounted on a carrier permanently secured in place on the rear of the automobile body. The present lock is intended to prevent unauthorized removal of a spare tire and rim from such a carrier.

The carriers most commonly employed are circular or arcuate rims of comparatively light material adapted snugly to fit against the inner surface of a spare tire rim. These carrier rims carry or comprise an instrumentality, such as a stud bolt, capable of receiving and supporting a lock comprising portions which when the lock is in place, overlie the adjacent margin of the spare tire rim to prevent its unauthorized removal from the carrier. In the past, however, locks of this kind frequently have been defeated by distorting the carrier rim in the vicinity of the lock and/or by distorting the lock supporting elements of the carrier in such a way as to move the lock into a position where it is ineffective to prevent removal of the spare tire rim from the carrier rim.

The lock of my present invention cannot be defeated in the manner described because it comprises means, preferably in the form of an arm or arms, which extends transversely over the inner surface of the carrier rim and is adapted by engaging co-operating unyielding means, preferably the margin of the spare tire rim remote from the lock, to prevent movement of the lock, by distortion of the carrier parts, to a position where it is ineffective to prevent removal of the spare tire rim from the carrier.

Other characteristic features and advantages will appear as the following detailed description progresses.

In the accompanying drawings,

Figure 1 is a sectional view through the lock mechanism taken on a plane transversely of the carrier and of the spare tire and rim;

Figure 2 is a front view of a lock mechanism with the locking plate removed, substantially in the condition illustrated in Figure 1;

Figure 3 is a horizontal sectional view through the lock mechanism taken substantially on the plane of the line 3—3 of Figure 2;

Figure 4 is a front elevational view illustrating the spare tire and carrier rim fragmentarily, and showing the lock mechanism with its locking plate in mounted position;

Figure 5 is a vertical fragmentary sectional view through the lock mechanism, showing the locking plate in position in the main body portion of the lock;

Figure 6 is a side view, partly in section of this removable locking plate;

Figure 7 is an elevational view of this locking plate viewed from the rear side;

Figure 8 is a fragmentary sectional view showing another interlocking relation which may be established by the lock mechanism;

Figure 9 is a transverse section showing a modification, and

Figure 10 is a reduced scale plan view of this modification.

The spare tire carrier, which is generally mounted at the rear of the car, is fragmentarily illustrated by the rim 11 (Figures 1 and 4). This carrier rim is of a diameter to receive the demountable rim 12 of the spare tire 13. Any suitable means may be provided for mounting this carrier rim 11 on the rear of the car, such as a plurality of spider rims having supporting connection with the carrier rim at spaced points. In some instances, the carrier rim 11 has an outwardly curved flange 14 at its rear edge to form a rear shoulder against which the demountable rim 12 engages; and in other instances an equivalent of this flange 14 is provided in the form of a plurality of outwardly extending lugs projecting from the rear edge of the carrier rim 11. Where such spaced lugs are employed, there is generally one of such lugs located at the lower point of fastening for the spare tire (this corresponding with the section plane of Figure 1), and accordingly the illustration of the outwardly turned flange 14 in Figure 1 will be representative either of such a flange or an outwardly extending lug.

At the uppermost point of the carrier rim 11 there is generally provided an opening (not shown) for receiving the valve stem of the spare tire 13. The extension of this valve stem down through this opening securely locks the upper part of the spare tire and rim to the carrier rim 11. The lower part of the spare tire and rim is generally fastened to the carrier rim 11 through the instrumentality of a threaded stud 16 which is anchored in a bracket 17 riveted to the inner side of the carrier rim 11. This threaded stud 16 is a relatively standardized fitting for receiving a removable clamping lug which is forced up against the side of the spare tire and rim by a nut screwing over the stud. This prior mode of fastening of course gives no locked security. In the adaptation of my improved locking device to these spare tire carriers I dispense with the clamping lug which usually fits over the threaded stud 16 but I utilize this threaded stud as a point of attachment for the locking device.

The present locking device comprises a main body portion 21, preferably in the form of a rectangular casting having a recess 22 in its front face. An elongated slot 23 extends through the back wall of the main body portion 21 and opens into the recess 22 for receiving the standard threaded stud 16. The elongated form of this slot 23 accommodates studs disposed at different heights relative to the carrier rim 11. The lower part of the main body portion 21 comprises a forwardly curved portion 24 which is adapted to extend down and overlie the front edge of the demountable rim 12 so as to effect clamping and locking engagement with this edge of the rim, preventing its removal from the lower part of the carrier rim 11. The lower extension 24 is forced into firm locking engagement with the edge of the demountable rim by a nut 18 which screws over the front end of the threaded stud 16 and bears against the back wall 25 of the recess 22. The blocking arm or arms which extends from the back of the body portion 21 for preventing backward prying of the lock body will be described in detail after describing the locking plate 26.

The nut 18 is locked against removal by a removable locking plate 26 which fits into the recess 22. As shown in Figures 5, 6, and 7, this locking plate has a polygonal opening 27 extending therethrough for receiving the nut 18 and the projecting end of the threaded stud 16. The nut 18 is either a square or hexagonal nut, preferably the latter, and the side walls 27' of the opening 27 are spaced so as to lie in close proximity to the side faces of such a nut for preventing its being turned in the opening 27. This opening is preferably elongated so as to accommodate the different heights of the threaded stud 16, as previously described in connection with the elongated slot 23. These threaded studs 16 also vary considerably in their lengths, but it will be observed that no difficulty can arise here because the stud extends entirely through the front of the locking plate 26.

The locking plate is locked in the main body portion 21 by lock mechanism 28 at the upper end of the removable plate, and by a locking lug 29 at the lower end of the plate. In mounting the plate 26 in the body portion 21 this lower locking lug 29 is first slipped into an undercut recess 31 which is formed in the bottom of the main recess 22. In this position the lug 29 co-operates with the front flange 32 which defines the front wall of the undercut recess 31, and thus securely locks the lower end of the plate in the main body portion.

The lock mechanism 28 comprises a pin tumbler lock or any other suitable form of lock which is housed in a sleeve 33 pinned or otherwise rigidly fastened in the upper end of the removable plate 26. The rotatable plug element of this lock has riveted to its rear end a rotatable locking lug 34. The housing sleeve 33 has an arcuate slot cut in its rear end defining limiting shoulders 35—35' which form stops for limiting the rotation of the lug 34. This lug 34 is adapted to effect locking engagement between a lug 36 extending rearwardly from the removable plate 26 and a pair of co-operating locking lugs 37 projecting forwardly from the rear wall of the recess 22. The lug 36 on the mounting plate is receivable in a depression 38 formed between the lugs 37—37 on the main body portion. As shown in Figure 6, the lug 36 has a locking slot 39 cut therein in the plane of the rotatable locking lug 34, and as shown in Figure 1, the lugs 37 on the main body portion 21 each have locking slots 41 cut therein in substantially the same plane. When the upper end of the removable plate 26 is swung up into the recess 22 as shown in Figure 5, the three locking slots 39 and 41—41 are brought into registry, and by now rotating the plug element of the lock through the key 42 the locking lug 34 is revolved into engagement with two, or all three of these locking slots. When thus held in locking position, it will be observed that no part of the rotatable plug or other portion of the lock mechanism will be subjected to strain incident to an outward pull applied to the removable plate 26 in an effort to break the lock, but instead, any such force will be confined entirely to the locking lug 34 by virtue of its interlocking engagement with the lug 36 on the removable plate and with one or both of the lugs 37 on the main body portion. Thus any effort to pull the locking plate out of the main body portion is resisted by the shearing strength of the locking lug instead of merely its bending strength. It will be observed from Figures 5 and 6 that the upper curved end of the removable locking plate 26 is sloped on a bevel, as indicated at 44 for matching with the beveled upper wall 45 of the recess 22, these two beveled surfaces permitting the inward swinging of the upper edge of the locking plate into the recess 22 after the lower lug 29 has been hooked behind the flange 34.

Heretofore, locks of this general type have been susceptible to circumvention by prying the main body portion 21 backwardly, or by prying that part of the carrier rim which carries bracket 17 away from the tire rim, so as to swing the lower locking shoulder 24 upwardly sufficiently to clear the adjacent edge of the demountable rim and permit its removal from the carrier. The type of bracket 17 most generally used on these tire carriers has insufficient strength to withstand the prying effort which it is possible to exert on the lock; and in the instances where this bracket is not bent by such efforts the stud 16 yields to this prying pressure or the portion of the carrier rim by which bracket 17 is carried is distorted away from the tire rim. The means which I employ to prevent this circumvention of the lock comprises an arm or arms extending back from the main lock body across the inner side of the carrier rim for engagement with a relatively unyielding blocking surface which prevents this backward prying of the lock body. In the particular embodiment shown in Figures 1, 3, and 4, I preferably construct the lock with two of these arms 51—51, both being constructed as integral extensions of the main body portion 21, extending backwardly across the inner side of the carrier rim and spaced to pass on each side of the bracket 17 which supports the threaded stud 16. These arms have hook-like ends 52 which drop down for engagement with the edge of the demountable rim 12 remote from the lock body or with the corresponding edge of the carrier rim 11. These arms thus form two spaced points of locking engagement between the locking device and the rear edge of the carrier rim or the demountable rim. By contacting with the rear edge of either of these rims, it will be observed that these arms make is practically impossible to pry or force the main body portion of the lock backwardly through the use of a jimmy or other tool; the arms in their engagement with the said rims constituting blocking means preventing the backward rocking of the lock body around the bracket 17 or stud 16. The typical demountable rim 12 is of such heavy gage metal that it constitutes in effect a rigid unyielding abutment surface for engagement by the arms 51. Moreover, by their engagement with the rear edges of these rims, these arms also prevent the lock body from being twisted to right or left in an effort to clear the overhanging edge 24 from the front edge of the demountable rim.

Attention is also directed to the fact that these arms 51 eliminate rattle of the locking device and of the spare tire rim owing to the fact that the pressure applied to the lock body through the screwing of the nut 18 up along the stud 16 forces the overhanging lower edge 24 into firm pressure engagement with the front edge of the demountable rim and forces the arms 51 down into firm pressure engagement with the rear edge of the demountable rim or into engagement with the rear edge of the carrier rim so that the locking element is held in pressure contact with the rim or rims at two spaced points.

As illustrated in Figures 1 and 5, the overhanging locking surface 24 has a notch or recess 54 formed therein for receiving the outwardly projecting edge of the demountable rim 12. The demountable rim which I have illustrated in Figure 1 is for the straight-sided type of tire. It will be noted that the notch 54 is operative to effect locking engagement with the edge of this type of rim to prevent upward movement of the lock body relative to the demountable rim. For the clincher type of tire the flanged edge of the demountable rim would curve inwardly in a gradual curve to receive the clincher bead of the tire casing. When the locking device is to be employed with tires of this class the lower locking surface 24 may be correspondingly curved to embrace this inwardly curved flange along the side of the demountable rim. Similarly, the ends 52 of the locking arms 51 may be differently conformed to co-operate with these two types of demountable rims, although I find that arms constructed substantially as shown in Figure 1 perform the necessary locking function with both types of rims.

As shown in Figure 8, these arms may engage with the carrier rim instead of the demountable rim. Thus, the device has ready adaptability to a wide range of sizes in rims.

In the modification shown in Figure 9, the arm 51' is designed for engagement with an unyielding stop member or blocking surface separate from the rim or rims. This stationary blocking member may consist of a bracket extension 56 supported by the carrier, or it may be a fixed bracket extending from the rear wall of the automobile body or some other relatively fixed point of attachment. The arm 51' bears upon the top of the bracket extension 56 to prevent the aforesaid rocking movement of the lock body; and the arm may also have side flanges 57 to embrace the sides of the bracket 56 to prevent lateral twisting of the lock body. As shown in plan in Figure 10, the arm 51' has a slotted opening 58 therein directly behind the lock body 21 for receiving the upper end of the stud bracket 17.

It will be evident that my invention can be embodied in a variety of different forms, and accordingly I do not intend to be limited to the particular details herein shown and described.

I claim:

1. The combination with a carrier rim adapted to receive a spare tire rim, said carrier rim comprising an upright bracket and a threaded stud projecting therefrom, of a locking unit adapted for mounting on said stud and removable therefrom in its entirety, said locking unit comprising a body portion, an opening in said body portion for receiving said stud, a shoulder adjacent said opening against which the nut on said stud is adapted to bear, means for preventing the unauthorized releasing of said nut, a locking shoulder depending from said body portion for over-hanging the edge of said spare tire rim, a hook-like flange of said shoulder adapted to engage the edge of said rim to prevent upward prying of said locking unit relative to said spare tire rim, and a pair of arms extending from said body portion back on each side of said bracket for bearing against the opposite side of one of said rims to prevent bending or prying said bracket or said carrier rim to release said spare tire rim.

2. The combination with a carrier member for receiving a spare tire rim, said carrier member comprising a bracket and a threaded stud projecting therefrom, of a locking unit adapted for detachable mounting on said stud and being removable therefrom in its entirety, said locking unit comprising a body portion having an opening therein for receiving said stud, a shoulder adjacent said opening against which the nut on said stud is adapted to bear, means carried by said body portion for preventing the unauthorized releasing of said nut, a locking shoulder extending from said body portion for overlying the edge of said spare tire rim, and an arm extending backwardly from said body portion for bearing adjacent the rear edge of said rim to prevent bending or prying of said carrier or said bracket to release said rim.

3. The combination with a carrier member adapted to receive a spare tire rim, said carrier member comprising a bracket and a threaded stud projecting therefrom, of a locking unit adapted for detachable mounting on said stud, said locking unit comprising a body portion having an opening therein for receiving said stud, a shoulder adjacent said opening against which the nut on said stud is adapted to bear, means carried by said body portion for preventing the unauthorized releasing of said nut, a locking shoulder extending from said body portion for engaging over the edge of said spare tire rim, said locking shoulder affording a point of locking engagement between said locking unit and said rim on the front side of said rim, and an arm extending from said body portion across the inner side of said rim to afford a point of locking engagement between said locking unit and the rear side of said rim.

4. The combination with a spare tire carrier adapted to receive a spare tire rim and having a fastening member projecting from said carrier, of a locking unit adapted to be locked to said fastening member, said locking unit comprising a shoulder adapted to overlie the spare tire rim at its front side and comprising a re-enforcing portion extending from said locking unit to engage a stationary surface adjacent said carrier to resist twisting or prying of said locking unit relative to said carrier, said locking unit being removable in its entirety from said fastening member.

5. The combination with a spare tire carrier adapted to receive a spare tire rim and having a fastening member thereon, of a locking unit adapted to be locked to said fastening member, comprising a front shoulder adapted to overlie the front edge of said spare tire rim and an arm extending back across said rim and adapted to overlie the rear part thereof, said locking unit being removable in its entirety from said fastening member.

6. The combination with a carrier rim having a stud extending therefrom, of a spare tire lock comprising a locking member removable in its entirety from said stud, lock means for securing said locking member to said stud, said locking member comprising a locking shoulder overhanging the edge of said carrier rim to lock the front edge of the demountable rim, and comprising an arm extending backwardly and downwardly over said carrier rim to effect locking engagement with the rear edge of said carrier rim.

7. The combination with a carrier rim having a threaded stud extending therefrom for receiving a nut, of a spare tire lock comprising a body portion having an opening therein for receiving said stud, said body portion being held to said stud by said nut, a releasable locking plate co-operating with said main body portion for preventing release of said nut, a locking shoulder on said main body portion, a co-operating locking shoulder on said plate adapted to substantially register with said first locking shoulder, and a locking lug adapted to be moved into engagement with both of said locking shoulders.

8. The combination with a carrier rim adapted to receive a spare tire and demountable rim and having a threaded stud extending therefrom, of a spare tire lock adapted for detachable mounting on said threaded stud and comprising a main body portion having an opening therethrough to accommodate the shank of said stud, a locking plate having an opening therein through which said stud is adapted to extend outwardly an unlimited distance and within which the nut for said stud is received and held against rotation with respect thereto, said main body portion having a recess therein in which said locking plate engages, a lug on the lower end of said locking plate engaging in a pocket in the lower end of said recess, a key actuated lock in the upper end of said plate comprising a locking lug adapted to engage in a locking slot in the upper part of said main body portion, said main body portion comprising a lower extension adapted to overlie the front edge of said demountable rim, and comprising a pair of backwardly extending arms adapted to overlie the rear edge of said carrier rim.

9. A device for preventing unauthorized removal of a tire rim from a carrier rim comprising a body member, adapted to be locked to means attached to the carrier rim, and comprising a part adapted to overlie an edge of the tire rim, and an arm carried by said body member extending across the inner surface of the carrier rim adapted to engage substantially unyielding means and thereby to prevent any forced movement of the body, radially of the tire rim, sufficient to withdraw said body part from the path of the tire carrier edge which it overlies.

10. A device for preventing unauthorized removal of a tire rim from a carrier rim comprising a body part disposed substantially at right angles to the common axis of the rims and disposed immediately adjacent to an edge of the tire rim, a groove in that portion of the body part which lies away from the axis of the rims, said groove receiving the aforesaid edge of the tire rim, means comprising cooperating threaded members for holding the body part against the aforesaid edge of the tire rim with said edge received in the said groove, a lockable cover carried by the body part adapted to prevent manipulating access to said threaded members, and means carried by the body part extending across the inner surface of the carrier rim and engaging the tire rim at the edge thereof which lies away from said body part.

11. A device for preventing unauthorized removal of a tire rim from a carrier rim comprising in combination, a body part disposed substantially at right angles to the axis of the tire rim and lying immediately adjacent to an edge of the tire rim, a groove in said body part receiving the aforesaid edge of the tire rim, cooperating threaded members, one of which lies in said body part, adapted to hold said body part tightly against the aforesaid edge of the tire rim with said edge received in said groove, lockable cover means carried by said body part for preventing manipulating access to said threaded members and means formed integral with the body part bridging the inner surface of the carrier rim and provided with means adapted to engage that part of the tire rim which lies away from said body part.

In witness whereof, I hereunto subscribe my name this 11th day of April, 1925.

FREDERICK E. BEACH.